(12) United States Patent
Frede

(10) Patent No.: US 9,590,387 B2
(45) Date of Patent: Mar. 7, 2017

(54) NON-REGENERATIVE OPTICAL ULTRASHORTPULSE AMPLIFIER

(71) Applicant: neoLASE GmbH, Hannover (DE)

(72) Inventor: Maik Frede, Hannover (DE)

(73) Assignee: neoLASE GmbH, Hannover (DE)

( * ) Notice: Subject to any disclaimer, the term of this patent is extended or adjusted under 35 U.S.C. 154(b) by 150 days.

(21) Appl. No.: 14/330,945

(22) Filed: Jul. 14, 2014

(65) Prior Publication Data

US 2015/0311667 A1    Oct. 29, 2015

Related U.S. Application Data

(63) Continuation of application No. PCT/EP2012/005260, filed on Dec. 19, 2012.

(30) Foreign Application Priority Data

Jan. 13, 2012   (DE) ........................ 10 2012 000 510

(51) Int. Cl.
*H01S 3/23* (2006.01)
*H01S 3/16* (2006.01)
*H01S 3/06* (2006.01)
*H01S 3/08* (2006.01)
*H01S 3/094* (2006.01)

(52) U.S. Cl.
CPC .......... *H01S 3/2316* (2013.01); *H01S 3/0612* (2013.01); *H01S 3/1611* (2013.01); *H01S 3/1618* (2013.01); *H01S 3/1643* (2013.01); *H01S 3/1671* (2013.01); *H01S 3/1673* (2013.01); *H01S 3/08072* (2013.01); *H01S 3/094038* (2013.01); *H01S 2301/04* (2013.01)

(58) Field of Classification Search
CPC ........ H01S 3/2316; H01S 3/0612; H01S 3/07; H01S 3/08086
See application file for complete search history.

(56) References Cited

U.S. PATENT DOCUMENTS 3,626,318 A    12/1971   Young
4,794,346 A    12/1988   Miller
(Continued)

FOREIGN PATENT DOCUMENTS

DE   10 2010 008 170 A1   8/2011
EP       556 977 A1        8/1993
(Continued)

OTHER PUBLICATIONS

"Operational Characteristics of dual gain single cavity Nd:YVO$_4$ laser" PRAMA—J Phys., vol. 58 No. 1, Jan. 2002, (8 pages).
(Continued)

*Primary Examiner* — Eric Bolda
(74) *Attorney, Agent, or Firm* — Shlesinger, Arkwright & Garvey LLP

(57) ABSTRACT

Non-regenerative optical amplifier has a first optical amplifying medium and at least one second optical amplifying medium. The non-regenerative optical amplifier may be an ultrashort pulse amplifier. The material properties of the first amplifying medium differ at least partially from the material properties of the second amplifying medium. The emission spectra of the amplifying media overlap partially, and the amplifying media are solid-state bulk crystals.

13 Claims, 7 Drawing Sheets

(56) References Cited

U.S. PATENT DOCUMENTS

| | | | |
|---|---|---|---|
| 5,867,305 A * | 2/1999 | Waarts | H01S 3/06754 359/337.12 |
| 5,926,494 A | 7/1999 | Pepper | |
| 5,930,283 A | 7/1999 | Imai | |
| 5,956,354 A | 9/1999 | Yan | |
| 6,144,484 A | 11/2000 | Marshall | |
| 6,373,864 B1 * | 4/2002 | Georges | H01S 3/0627 372/10 |
| 7,796,671 B2 | 9/2010 | Peng et al. | |
| 7,894,501 B2 | 2/2011 | Adachi | |
| 2001/0038658 A1 | 11/2001 | Contag et al. | |
| 2002/0075934 A1 | 6/2002 | Ludewigt et al. | |
| 2002/0085608 A1 * | 7/2002 | Kopf | H01S 3/09415 372/75 |
| 2002/0186455 A1 * | 12/2002 | Ketteridge | C03C 10/00 359/333 |
| 2003/0053508 A1 * | 3/2003 | Dane | H01S 3/0941 372/70 |
| 2006/0239304 A1 * | 10/2006 | Yin | H01S 3/1301 372/19 |
| 2007/0297481 A1 * | 12/2007 | Adachi | H01S 3/07 372/70 |
| 2009/0092993 A1 | 4/2009 | Kallioniemi et al. | |
| 2009/0274183 A1 | 11/2009 | Kakui | |
| 2009/0279577 A1 | 11/2009 | McCarthy | |

FOREIGN PATENT DOCUMENTS

| | | |
|---|---|---|
| EP | 1 677 394 A1 | 7/2006 |
| EP | 1879271 A2 | 1/2008 |
| WO | WO 98/59399 | 12/1998 |
| WO | WO 00/25394 | 5/2000 |

OTHER PUBLICATIONS

"Generation of sub-40 fs pulses from a mode-locked dual-gain-media Nd:glass laser" Applc. Phys. B-74 (Suppl.) pp. 177-179 (2002), (3 pages).

"Regenerative thin disk amplifier with combined gain spectra producing 500μJ sub 200 fs pulses" (May 11, 2009, vol. 17, No. 10/Optics Express, pp. 8046ff), (5 pages).

"Ultrafast double-slap regenerative amplifier with combined gain spectra and intercavity dispersion compensation" (Oct. 11, 2010/ vol. 18, No. 21/Optics Express, pp. 21973ff), (8 pages).

"PCT International Preliminary Report on Patentability" PCT/EP2012/005260 International Filing Date Dec. 19, 2012. (8 pages).

"International Search Report" regarding PCT/EP2012/005260, filed Dec. 19, 2012, (3 pages).

"Written Opinion of the International Searching Authority", regarding PCT/EP2012/005260, dated Aug. 5, 2013. (8 pages).

* cited by examiner

NON-REGENERATIVE OPTICAL ULTRASHORTPULSE AMPLIFIER

CROSS REFERENCE TO RELATED APPLICATIONS

This application is a continuation of Application No. PCT/EP2012/005260, filed 19 Dec. 2012, which claims the priority of German Application No. 10 2012 000 510.5, filed 13 Jan. 2012, and each of which is incorporated herein by reference.

FIELD OF THE INVENTION

The invention relates to a non-regenerative optical amplifier.

BACKGROUND OF THE INVENTION

Amplifiers of this type are generally known, and are used to amplify an incoming optical signal.

In this regard, a distinction is made between regenerative and non-regenerative amplifiers.

A regenerative amplifier is composed of a gain medium, an optical resonator, and an optical switch which is used to couple/decouple laser radiation into and out of the resonator, respectively. As a result, in a regenerative amplifier the signal to be amplified is amplified by the gain medium within a resonator over a plurality of passes on the same beam path.

In contrast, a resonator is not present in a non-regenerative amplifier. In other words, a non-regenerative amplifier is an amplifier without a resonator. In a non-regenerative amplifier, the signal to be amplified may be amplified in a single pass through the gain medium. However, it is also possible to amplify the signal to be amplified by passing the signal through the gain medium multiple times on different beam paths. Accordingly, a non-regenerative optical amplifier has neither an optical resonator nor an optical switch. In the simplest case, the non-regenerative optical amplifier is composed solely of an optical gain medium and an excitation light source.

An optical oscillator is known from "Operational characteristics of dual gain single cavity Nd:YVO$_4$ laser" (PRAMANA-J. phys., Vol. 58, No. 1, January 2002) which has a resonator in which two Nd:YVO$_4$ laser crystals as gain media are situated.

An optical oscillator having two gain media is also known from DE 10 2010 008 170 A1.

A mode-coupled oscillator is known from "Generation of sub-40 fs pulses from a mode-locked dual-gain-media Nd:glass laser" (Appld. Phys. B 74 (Suppl.), pp. 177-179 (2002)) which has a resonator in which two different laser crystals as gain media are situated.

A similar mode-coupled oscillator is also known from U.S. Pat. No. 5,956,354.

A regenerative optical amplifier is known from "Regenerative thin disk amplifier with combined gain spectra producing 500 µJ sub 200 fs pulses" (May 11, 2009/Vol. 17, No. 10/Optics Express, pp. 8046ff.) in which different optical gain media are used.

A similar regenerative amplifier is also known from "Ultrafast double-slap regenerative amplifier with combined gain spectra and intracavity dispersion compensation" (Oct. 11, 2010/Vol. 18, No. 21/Optics Express, pp. 21973ff.).

A laser is known from U.S. Pat. No. 5,956,354 which has a resonator in which two different laser crystals as optical gain media are situated.

A non-regenerative optical amplifier is known from U.S. Pat. No. 6,144,484 which has a laser crystal as gain medium and which is based on the continuous wave (CW) emission principle.

A non-regenerative optical amplifier is known from U.S. Pat. No. 7,796,671 which has a laser crystal with multiple passes as gain medium.

Optical fiber amplifiers having multiple optical fibers coupled in succession are known from US 2009/0274183 A1, for example.

A laser system is known from US 2009/0279577 A1 in which a ceramic laser material having a doping gradient is used as gain medium.

A mode-coupled optical resonator is known from US 2006/0092993 A1 which has a plurality of gain media situated in succession along the optical axis.

A laser oscillator is known from U.S. Pat. No. 7,894,501 B2 (corresponding to EP 1 879 271 A2) which has a plurality of gain media.

Laser systems having a plurality of gain media are also known from WO 98/59399 and U.S. Pat. No. 5,930,283.

In addition, disk lasers are known which have a plurality of gain media. Disk lasers of this type are disclosed in EP 1 677 394 A1, US 2002/0075934 A1, U.S. Pat. No. 5,926,494, US 2001/0038658 A1, WO 00/25394, and EP 0 556 977 A1, for example.

OBJECTS AND SUMMARY OF THE INVENTION

The object of the invention is to provide a non-regenerative optical amplifier having particularly favorable properties.

This object is achieved by the invention set forth herein.

The invention provides a non-regenerative optical amplifier which includes at least two optical gain media whose material properties differ at least partially from one another, the emission spectra of the gain media partially overlapping. The invention makes possible, for example, amplification of laser pulses in the range of one picosecond by enlarging the emission bandwidth.

The invention further provides a non-regenerative optical ultrashortpulse amplifier including a first optical gain medium and a second optical gain medium, the material properties of the first optical gain medium differing, at least partially, from the material properties of the second optical gain medium. The emission spectra of the optical gain media partially overlap, and the emission spectra of the first and second optical gain media are selected to overlap in such a way that a gain spectrum results which is spectrally expanded as compared to the individual emission spectra. The optical gain media may be formed by solid-state bulk crystals.

Furthermore, by use of the invention it is possible, for example, to influence the absorption of the excitation light in the gain media in a targeted manner. In addition, the thermal properties of the amplifier may be influenced according to the invention, for example to influence the temperature prevailing in the gain media during operation of the amplifier.

For example and in particular, the amplifier according to the invention may be designed as a short pulse or ultrashort pulse amplifier and used for amplifying laser pulses having pulse durations of several ps or shorter. A minimum spectral bandwidth is necessary for amplifying a pulse having a certain pulse duration. The so-called pulse bandwidth product is a function of the pulse shape, and is in the range of approximately 0.315 for a sech$^2$-shaped pulse and approximately 0.44 for a Gaussian-shaped pulse. For bandwidth-limited Gaussian-shaped pulses having a pulse duration of 5 ps and a central wavelength of 1064 nm, a gain bandwidth of, for example, at least 90 GHz (corresponding to 0.34 nm) for a pulse duration of 1 ps, even 440 GHz (corresponding to 1.66 nm), is necessary. Accordingly, a wider gain spectrum is necessary the shorter the pulse to be amplified.

According to the invention, the optical gain media are solid-state bulk crystals. As opposed to fiber lasers, the invention thus uses solid-state crystals as gain media. As opposed to a gain medium which is used in a disk laser and which has a small extension of typically between 80 μm and 200 μm along the optical axis, the invention uses bulk crystals as gain media whose extension along the optical axis is greater than for a disk laser. For example and in particular, a solid-state bulk crystal used in a non-regenerative amplifier according to the invention may have a thickness of greater than 1000 μm along the optical axis.

For example and in particular, an amplifier according to the invention having an emission effective cross section (emission efficiency) of >1×10$^{-19}$/cm$^2$ may be used. In such an embodiment, the invention skillfully combines gain media which have a relatively high emission efficiency and which in combination with one another ensure that a sufficient emission bandwidth is achieved. In this regard, the invention combines solid-state bulk crystals having narrower emission spectra and high emission effective cross sections, which allows non-regenerative gain of short and ultrashort laser pulses. The following table shows the emission efficiency and the emission bandwidth for different laser materials:

| Laser material | Emission efficiency (*10$^{-19}$/cm$^2$) | Emission bandwidth (nm) |
| --- | --- | --- |
| Nd: YVO$_4$ | 15.6 | 0.8 |
| Nd: GdVO | 7.6 | 0.85 |
| Nd: YAG | 2.8 | 0.45 |
| Nd: YLF | 1.2 | 0.9 |
| Yb: YAG | 0.2 | ~15 |
| Yb: KGW | 0.26 | ~37 |
| Yb: KYW | 0.3 | ~33 |

The table illustrates by way of example that when an individual laser material is used, the requirement for a sufficiently large emission bandwidth conflicts with the requirement for a simultaneous high emission efficiency. According to the invention, sufficient gain may be achieved without using chirped pulse amplification or chirped pulse gain or regenerative gain.

Thus, via the design of a non-regenerative optical amplifier, the invention opens up additional possibilities which in the prior art, specifically for gain of short or ultrashort pulses, was achievable only using regenerative amplifier systems.

According to the invention, the gain media may be spatially embodied and situated relative to one another in any arbitrary manner. The gain media may in particular be laser crystals which are formed as doped host crystals. The laser crystals may be spatially situated so as to be spaced apart or joined together, for example bonded. According to the invention it is also possible to form the gain media from an individual mixed crystal, for example, containing different laser-active ions which on the one hand form the first gain medium, and which on the other hand form at least one second gain medium.

If according to the invention more than two gain media are used, the overlap according to the invention of the emission spectra in each case refers to spectrally adjacent gain media.

Advantageous and practical refinements of the invention are set forth in the subclaims.

The invention is explained in greater detail below with reference to the appended drawings, which illustrate embodiments of a non-regenerative optical amplifier according to the invention in a highly schematic manner. All features which are described, illustrated in the drawings, and claimed in the patent claims, alone or in any technically meaningful combination, constitute the subject matter of the invention, regardless of their recapitulation in the patent claims or their dependencies, and regardless of their description or illustration in the drawings.

BRIEF DESCRIPTION OF THE DRAWINGS

The figures show the following:

FIG. 1a shows a first embodiment of an amplifier according to the invention in a highly schematic, block diagram-like manner;

FIG. 1b shows an embodiment of a further amplifier stage, which may be situated downstream from the second amplifier stage of the first embodiment of FIG. 1a;

FIG. 2 shows a diagram for illustrating the individual emission spectra of the gain media used in the amplifier according to FIG. 1a;

FIG. 3 shows a diagram for illustrating the resulting emission spectrum of the amplifier according to FIG. 1a;

DETAILED DESCRIPTION OF THE INVENTION

Figures 1A, 1B:
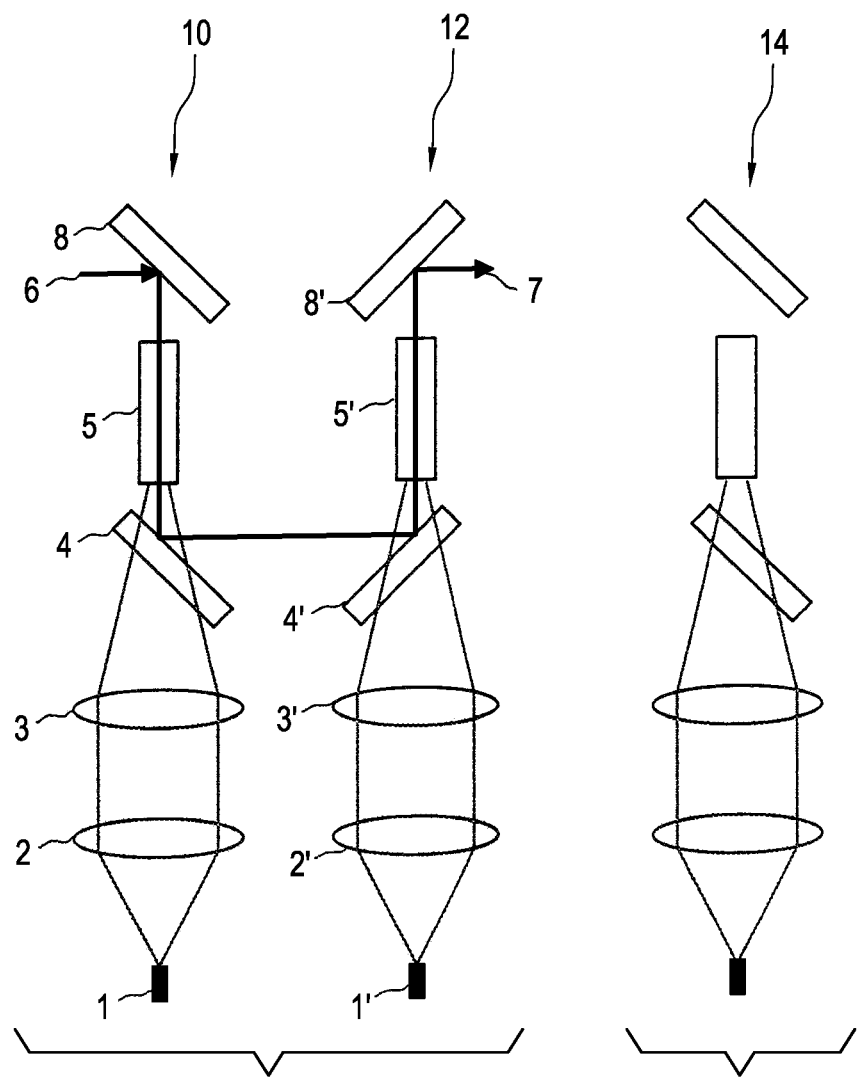

Identical or corresponding components are provided with the same reference numerals in the figures of the drawing.

FIG. 1a illustrates a first embodiment of a non-regenerative optical amplifier according to the invention. An excitation light source by means of which excitation light is irradiated into the amplifier is denoted by reference numeral 1. The excitation light source may be configured as a fiber-coupled light source or as a free space light source. In the present embodiment, a lens system which is composed of two lenses 2, 3 and used for focusing the excitation light beam is situated downstream from the excitation light source 1. The lens system is situated downstream from a first mirror 4 which is highly reflective for the laser wavelength of a first optical gain medium (laser medium), but highly transmissive for the wavelength of the excitation light. An input beam to be amplified, denoted by reference numeral 6 in FIG. 1a, is coupled in via a second mirror 8. The first optical gain medium 5, which in the present embodiment is formed by a doped host crystal, namely, Nd:YVO$_4$, is situated between the mirrors 4, 8. The above-described arrangement forms a first amplifier stage 10 of the amplifier. The output beam of the first amplifier stage 10 is deflected via the mirror 4 to a second amplifier stage 12 which in its basic design corresponds to the first amplifier stage 10. However, unlike the first amplifier stage 10, the second amplifier stage 12 has a second gain medium (second laser medium 5'), which in the present embodiment is formed by a doped host crystal, namely, Nd:GdVO$_4$. The output beam of the amplifier is denoted by reference numeral 7 in FIG. 1a.

According to the invention, the gain media 5, 5' are formed as solid-state bulk crystals whose length along the optical axis in the present embodiment is greater than 1000 μm.

Thus, due to the use of different laser crystals, the material properties of the first laser medium 5 differ from the material properties of the second laser medium 5', the emission spectra of the laser media 5, 5' partially overlapping according to the invention.

If necessary or desired, depending on the individual requirements, even further amplifier stages may be situated downstream from the second amplifier stage 12, as indicated by reference numeral 14 in FIG. 1b.

Due to the use of the different laser media 5, 5' having partially overlapping emission spectra, the amplifier illustrated in FIG. 1a makes possible generation of a new, expanded gain spectrum, and thus, amplification of laser pulses in the range of approximately 0.5 ps to 10 ps.

Figure 2:
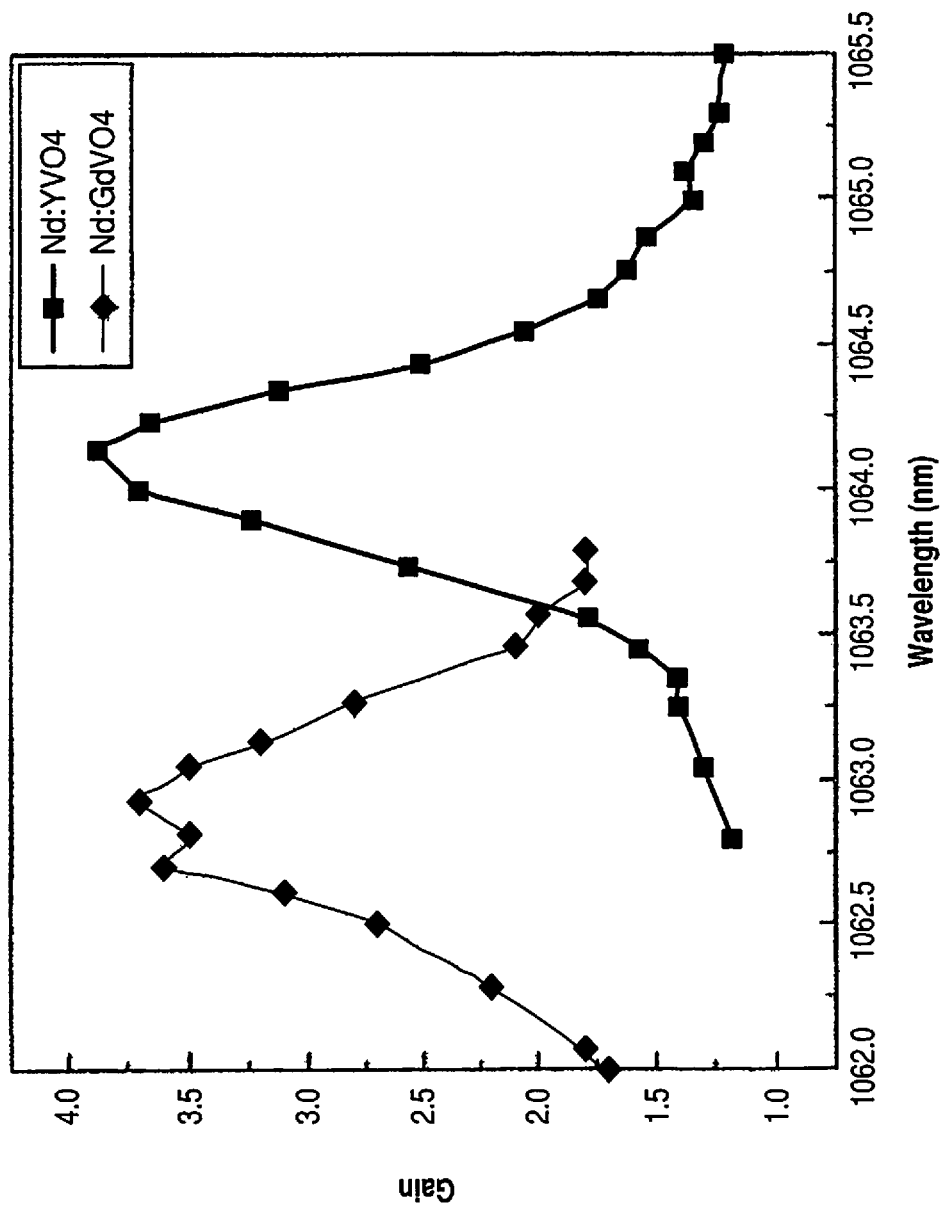

FIG. 2 shows a diagram for illustrating the emission spectra of the laser media 5, 5'.

Figure 3:
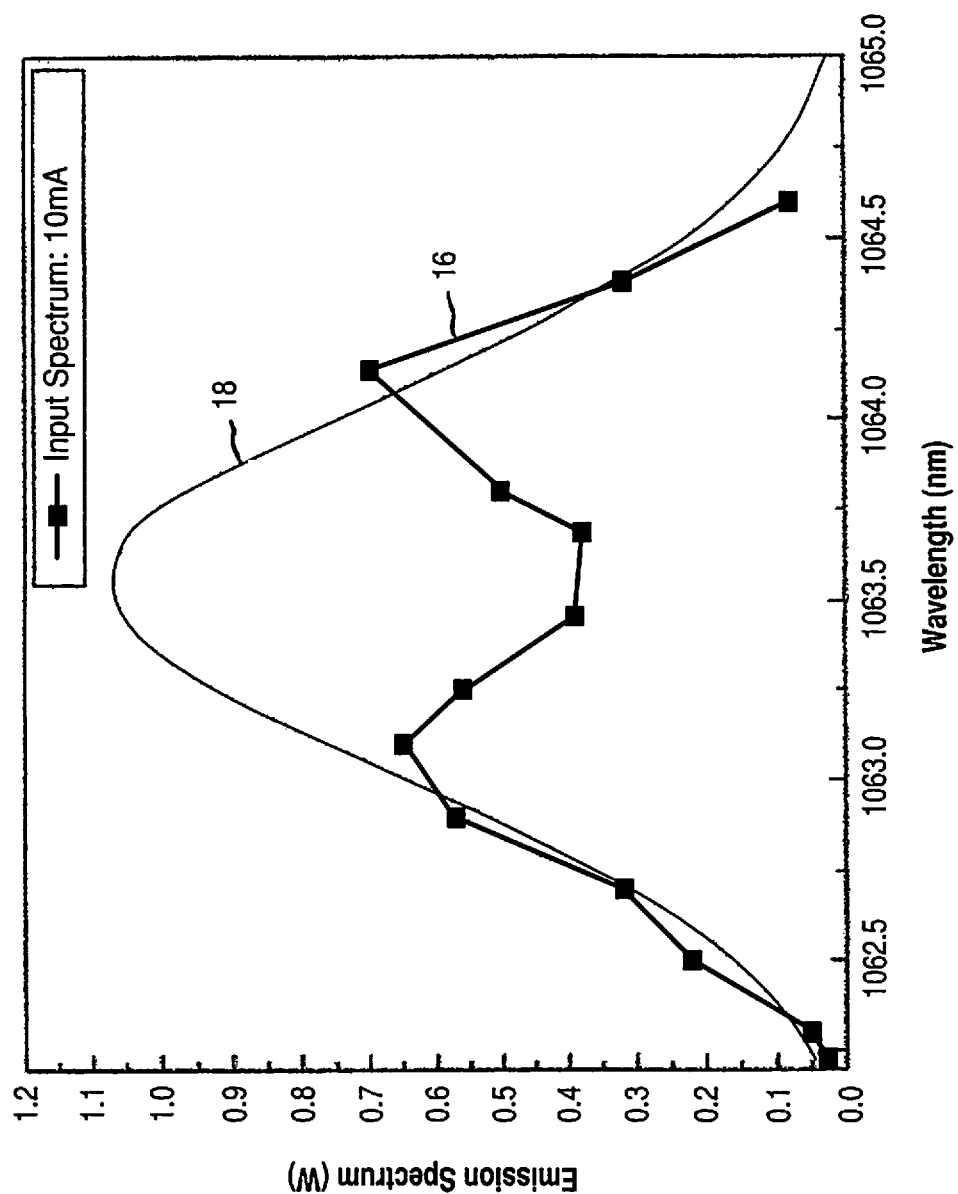

FIG. 3 illustrates the emission spectrum, denoted by reference numeral 16, which results when the laser media 5, 5' are used. One possible input spectrum to be amplified, having a half-width value of approximately 2 nm, is denoted by reference numeral 18 in FIG. 3. With this spectral width of the emission spectrum, amplification of pulses in the range of below 1 ps, for example, is possible.

Figure 4:
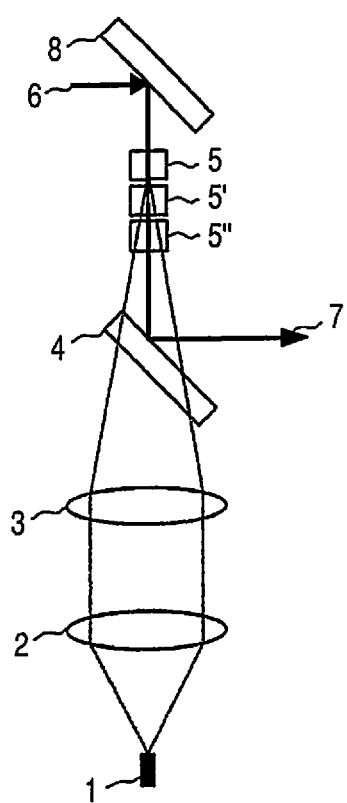
FIG. 4 shows, in the same manner as FIG. 1a, a second embodiment of an amplifier according to the invention.

FIG. 4 illustrates a second embodiment of an amplifier according the invention which differs from the embodiment according to FIG. 1a in that the different laser media within the amplifier stage are situated between the mirrors 4, 8. Strictly by way of example, FIG. 4 illustrates three laser media 5, 5', 5" situated in direct succession, i.e., without mirrors or other beamforming or beam-deflecting apparatuses situated in between.

The third laser medium 5" is illustrated strictly by way of example and representative of the fact that, depending on the particular requirements, any arbitrary number of laser media may be used. The following discussion considers the properties which result from combining the first laser medium 5 with the second laser medium 5'.

In the illustrated embodiment, the material properties of the laser media 5, 5' are selected for influencing the absorption curve along the crystal axis in a targeted manner.

Figure 5:
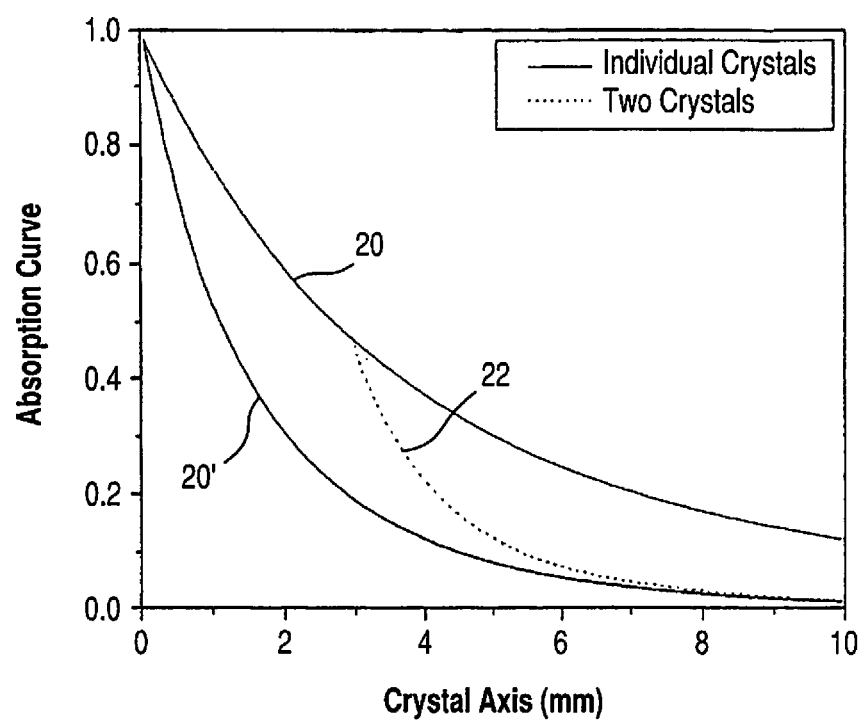
FIG. 5 shows a diagram for illustrating the spatial dependency of the absorption of the excitation light in the embodiment according to FIG. 4.

FIG. 5 illustrates the absorption curve along the crystal axis, the absorption curve for the individual crystals being denoted by reference numerals 20, 20', and the absorption curve which results from combining the laser media or laser crystals 5, 5' being denoted by reference numeral 22. In the illustrated embodiment, the laser crystals 5, 5' are Nd:YVO$_4$, laser crystal 5 being 0.2 at %-doped, and the other laser crystal 5' being 0.5 at %-doped.

As is apparent from FIG. 5, the absorption curve and thus the longitudinal distribution of the pump power may be influenced in this way. In addition, due to the improved absorption, the length of the laser crystals or laser media 5, 5' may be shortened, which allows better spatial overlap between laser modes and pump mode. This has a beneficial effect on the overall efficiency of the amplifier system.

Figure 6:
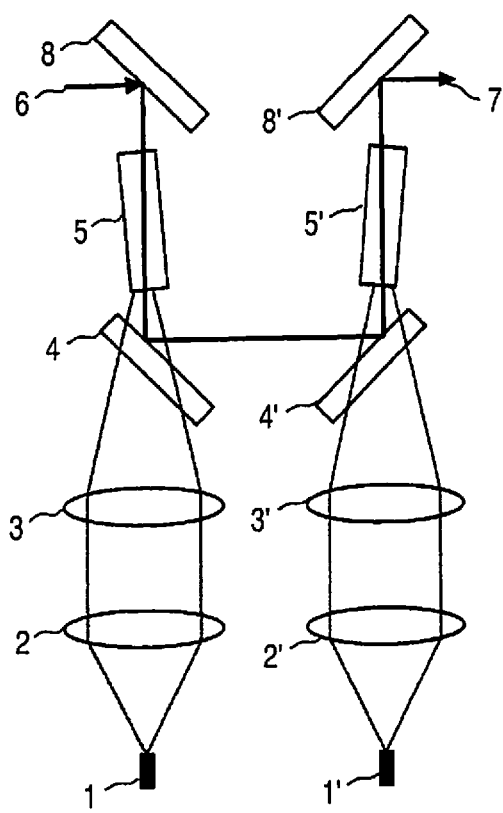
FIG. 6 shows, in the same manner as FIG. 1a, a third embodiment of an amplifier according to the invention.

FIG. 6 illustrates a third embodiment of an amplifier according to the invention in which the laser crystals 5, 5' are each tilted with respect to the optical axis. Due to the tilting of the laser crystals 5, 5' with respect to the optical axis, undesirable effects such as parasitic lasers or amplified spontaneous emission (ASE) are avoided. Corresponding tilting of the gain media with respect to the optical axis may also be used in the preceding embodiments.

Figure 7:
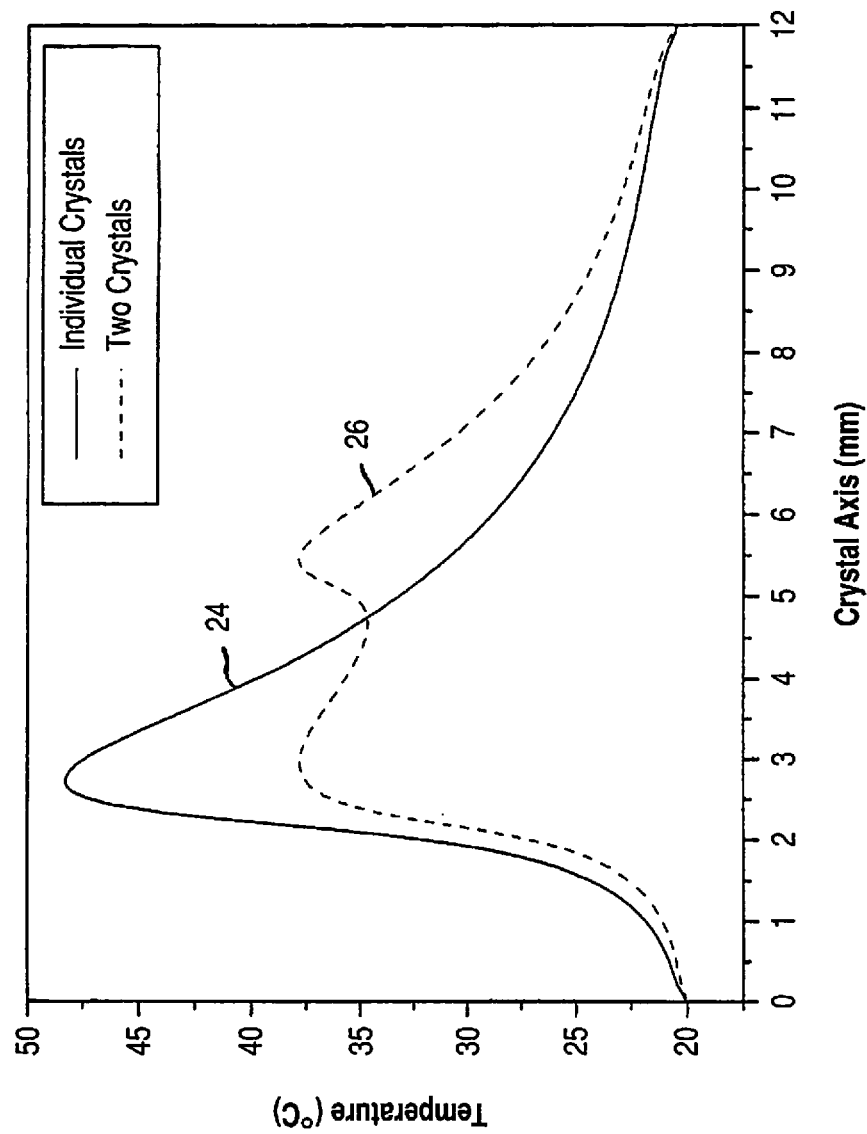
FIG. 7 shows a diagram for illustrating the spatial dependency of the temperature along the crystal axis during operation of the amplifier according to FIG. 6.

FIG. 7 shows the temperature curve along the crystal axis which results during operation of the amplifier. The temperature curve which results when an individual laser crystal is used is denoted by reference numeral 24. In contrast, the temperature curve which results when two laser crystals are used, as illustrated in FIG. 4, is denoted by reference numeral 26. It is apparent from FIG. 7 that the maximum temperature which occurs in the laser crystals may be greatly reduced by using two laser crystals 5, 5'. The reduction in temperature is advantageous for temperature-dependent effects, such as thermally induced stresses which may result in destruction of a laser crystal, and thermo-optical effects such as the thermal lens.

The invention thus opens up new possibilities for the design of non-regenerative optical amplifiers.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention.

The invention claimed is:

1. Non-regenerative optical ultrashort pulse amplifier, comprising:
    a) a first optical gain medium;
    b) a second optical gain medium;
    c) the material properties of the first optical gain medium differ at least partially from the material properties of the second optical gain medium;
    d) the emission spectra of the first and second optical gain media partially overlap, the emission spectra of the first and second optical gain media are selected to overlap in such a way that a gain spectrum results which is spectrally expanded as compared to the individual emission spectra of the respective first and second optical gain medium;
    e) the first and second optical gain media are formed by solid-state bulk crystals;
    f) at least one of the first and second optical gain media contains a host crystal which is doped with a dopant; and
    g) the dopant is Nd or Yb.

2. Ultrashort pulse amplifier according to claim 1, wherein:
    a) the gain media have an emission effective cross section (emission efficiency) of $>1 \times 10^{-19}/cm^2$.

3. Ultrashort pulse amplifier according to claim 2, wherein:
    a) the solid-state bulk crystals each have a length of greater than 1000 μm along the optical axis.

4. Ultrashort pulse amplifier according to claim 1, wherein:
    a) the host crystal contains one of YVO$_4$, GdVO$_4$, LuVO$_4$, Ylf, and YAG.

5. Ultrashort pulse amplifier according to claim 1, wherein:
   a) an excitation light source is designed for mode-selective longitudinal excitation of the first and second optical gain media.

6. Ultrashort pulse amplifier according to claim 5, wherein:
   a) the excitation light source for exciting the first and second gain media has an excitation wavelength for excitation at 800-1000 nm.

7. Ultrashort pulse amplifier according to claim 1, wherein:
   a) the output signal of the amplifier is a pulse signal having a pulse duration of 0.5 ps to 50 ns, in particular 0.5 ps to 10 ps.

8. Ultrashort pulse amplifier according to claim 1, wherein:
   a) the first and second optical gain media are situated in direct succession in the irradiation direction of an excitation light source.

9. Ultrashort pulse amplifier according to claim 1, wherein:
   a) for influencing the absorption curve in a targeted manner, the first and second optical gain media which are situated in direct succession in the irradiation direction of the excitation light source have different absorption properties.

10. Ultrashort pulse amplifier according to claim 1, wherein:
    a) the first and second optical gain media include at least one laser crystal which is tilted relative to the optical axis of the amplifier.

11. Ultrashort pulse amplifier according to claim 1, wherein:
    a) the input signal of the amplifier originates from seed source such as a fiber oscillator or solid-state oscillator which is one of mode-coupled and pulsed in some other way, or a semiconductor laser.

12. Ultrashort pulse amplifier according to claim 1, wherein:
    a) the solid-state bulk crystals each have a length of greater than 1000 μm along the optical axis.

13. Ultrashort pulse amplifier according to claim 1, wherein:
    a) at least one of the first and second optical gain media contains a host crystal which is doped with a dopant.

* * * * *